Patented Mar. 6, 1923.

1,447,452

UNITED STATES PATENT OFFICE.

LEONARD WICKENDEN, OF FLUSHING, NEW YORK.

COLLOIDAL DECOLORIZING MATERIAL AND PROCESS OF PRODUCING THE SAME.

No Drawing. Application filed February 25, 1919. Serial No. 279,211.

*To all whom it may concern:*

Be it known that I, LEONARD WICKENDEN, a subject of the King of Great Britain, and resident of Flushing, Queens County, State of New York, have made certain new and useful Inventions Relating to Colloidal Decolorizing Material and Processes of Producing the Same, of which the following is a specification.

This invention relates especially to colloidal decolorizing material for use in decolorizing organic liquids or solutions and to processes of producing such decolorizing material by incorporating suitable colloidal inorganic matter with suitable cooperating decolorizing material, such, for example, as the porous carbonized dissolved woody material, which may be formed by carbonizing at high heat the caustic soda waste liquor from the caustic soda wood pulp process. Suitable cooperating colloidal material, such as colloidal solutions of iron, aluminum, magnesium and the like, may be intimately incorporated or combined with such decolorizing material, and in some cases the combined material may be substantially dried for transportation and use without destroying the added decolorizing power of this incorporated colloidal material.

A suitable decolorizing carbon for use in this connection may be produced from the waste liquors from wood pulp paper manufacture. In the manufacture of paper from wood or the like by the caustic soda process the digestion of the wood chips in the caustic soda cooking liquor produces in addition to the insoluble cellulose a solution of ligneous or woody material which may with advantage be evaporated substantially to dryness and then dried and carbonized in a suitable kiln in the presence of small or limited quantities of air. When this carbonization is conducted at high heat the resulting material is relatively free from hydrocarbons and highly porous in all directions so as to have a relatively small specific gravity because of its high percentage of voids. For decolorizing purposes this carbonized material is preferably leached to remove soluble inorganic matter and can advantageously in some cases be treated with weak acid solutions, such as sulphuric or hydrochloric acid and then washed and dried.

This crude decolorizing carbon or any other suitable carbonized material preferably of a somewhat porous character may with advantage have incorporated therewith suitable colloidal material which considerably increases its decolorizing value for many purposes. For this purpose colloidal solutions of aluminum, iron, magnesium and so forth, may be incorporated with decolorizing material of this general type as by plunging the heated decolorizing material into such a colloidal solution and then stirring to secure thorough incorporation after which in some cases the mixed or treated decolorizing material may, preferably after draining, be dried for future use without destroying the increased decolorizing power secured through the presence of this added colloidal material. This desirable effect seems to be due to the fact that decolorizing carbon of this character perhaps because of its finely divided or active carbon component, acts as a protective colloid in preventing the conversion of the incorporated colloidal material, so that even after drying this colloidal material is still available in colloidal form for decolorizing or other generally similar action in connection with solutions or liquids, such as sugar, glycerine or other colored solutions. In this way the decolorizing power of porous carbon of this general type may be increased 50 to 100 per cent or more for certain decolorizing purposes and the range of its decolorizing action can sometimes be extended so that it may be more valuable for certain additional classes of liquids as well.

An illustrative way of effecting this incorporation of cooperating colloidal material is to incorporate the porous decolorizing carbon therewith under suitable conditions of heat; and when granulated or relatively finely divided porous carbonized decolorizing matter of this character is boiled or heated with a two per cent colloidal solution of aluminum hydroxide, for instance, a considerable amount of this colloidal material is adsorbed or incorporated with the carbon and this composite colloidal decolorizing material may be removed from the solution and drained and if desired dried at about 100° C. or so which does not destroy or seriously impair its decolorizing action. The incorporation of such colloidal material increased by several times the decolorizing power of the material on a test sugar solution and the material also had increased decolorizing action on other colored solutions or liquids. The colloidal solution of ferric hydrate may be similarly incorporated with such porous decolorizing carbon or other suitable material, such, for instance, as kieselguhr, fuller's earth, or other generally similar infusorial earths which in some cases have some decolorizing action in themselves aside from their function in acting as supports or carriers for this incorporated colloidal material. A water solution of colloidal ferric hydrate having a strength of three to five per cent more or less may while heated have such decolorizing carbon which has been heated to redness plunged into the solution and stirred or agitated therein for ten to twenty minutes or so after which the carbon may be filtered out and dried at 100° C. or so, which in this case also does not destroy the added decolorizing action of the incorporated colloidal material apparently because of the protective action of the colloidal or other special form of carbon present.

In the case of some incorporated colloidal materials such as colloidal solutions of magnesium or the like the carbon does not seem to effectively retain them when the composite material is dried in their colloidal condition in which they are most active for decolorizing purposes, and in such cases the decolorizing carbon or other basic material after the incorporation of such colloidal material therewith should be promptly used for decolorizing or similar purposes without drying which might materially decrease its decolorizing power. A colloidal solution of magnesium hydrate in water may be incorporated with such porous decolorizing carbon by heating the carbon to redness and then plunging it into the colloidal solution and agitating the mixture for a sufficient time to thoroughly incorporate the components after which the treated and impregnated carbon may be drained and filtered and used while still wet or moist for decolorizing purposes in connection with various materials.

This invention has been described in connection with a number of illustrative embodiments, arrangements, materials, concentrations, methods, temperatures and times of treatments, to the details of which disclosure the invention is not of course to be limited, since what is claimed as new and what is desired to be secured by Letters Patent is set forth in the appended claims.

1. The process of increasing the decolorizing power of porous carbonized dissolved woody material which comprises heating such material and agitating the same in a colloidal solution of aluminum hydroxide, draining and separating the surplus solution from the decolorizing material and drying the same at temperatures not greatly exceeding 100° centigrade so that the incorporated substantially dry colloidal material remains effective for decolorizing purposes in connection with the decolorizing carbon with which it is incorporated.

2. The process of increasing the decolorizing power of porous carbonized material which comprises heating such material and treating the same in a colloidal solution of aluminum hydroxide, separating the surplus solution from the decolorizing material and drying the same so that the incorporated substantially dry colloidal material remains effective for decolorizing purposes in connection with the decolorizing carbon with which it is incorporated.

3. The process of increasing the decolorizing power of porous carbonized decolorizing material which comprises incorporating with such material a colloidal solution of an iron group metal hydroxide, separating the surplus solution from the decolorizing material and drying the same at temperatures not greatly exceeding 100° centigrade to maintain the incorporated substantially dry colloidal material effective for decolorizing purposes in connection with the decolorizing carbon with which it is incorporated.

4. The process of increasing the decolorizing power of porous carbonized decolorizing material which comprises incorporating with such material a colloidal solution and drying the treated decolorizing material to maintain the incorporated substantially dry colloidal material effective for decolorizing purposes in connection with the decolorizing carbon with which it is incorporated.

5. The process of increasing the decolorizing power of porous decolorizing material which comprises incorporating with such material a colloidal solution of aluminum hydroxide, and separating the surplus solution from the decolorizing material.

6. The process of increasing the decolorizing power of decolorizing material which comprises incorporating with such material a colloidal solution, and separating the surplus solution from the decolorizing material.

7. The process of increasing the decolorizing power of porous carbonaceous decolorizing material which comprises incorporating with such material a colloidal solution of an iron group metal, and separating surplus solution from the decolorizing material so that the incorporated colloidal material is effective for decolorizing purposes in connection with the decolorizing carbon with which it is incorporated.

8. The process of increasing the decolorizing power of carbonaceous decolorizing material which comprises incorporating with such material a colloidal solution and separating surplus solution from the decolorizing material.

9. The substantially dry porous carbonized decolorizing material comprising incorporated colloidal aluminum substantially effective for decolorizing purposes and intimately united or incorporated with the finely divided porous decolorizing carbon.

10. The substantially dry porous carbonized decolorizing material comprising incorporated colloidal iron group metal substantially effective for decolorizing purposes and intimately incorporated with the porous decolorizing carbon.

11. The porous carbonized decolorizing material comprising colloidal material incorporated with the porous decolorizing carbon.

LEONARD WICKENDEN.